(12) United States Patent
Muraoka et al.

(10) Patent No.: US 8,105,711 B2
(45) Date of Patent: Jan. 31, 2012

(54) NONAQUEOUS ELECTROLYTE SECONDARY BATTERY

(75) Inventors: Yoshiyuki Muraoka, Osaka (JP); Hajime Nishino, Nara (JP); Yukihiro Okada, Osaka (JP); Miyuki Nakai, Osaka (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 12/307,675

(22) PCT Filed: Apr. 1, 2008

(86) PCT No.: PCT/JP2008/000844
§ 371 (c)(1),
(2), (4) Date: Jan. 6, 2009

(87) PCT Pub. No.: WO2008/136177
PCT Pub. Date: Nov. 13, 2008

(65) Prior Publication Data
US 2009/0311585 A1 Dec. 17, 2009

(30) Foreign Application Priority Data
Apr. 12, 2007 (JP) .................................. 2007-105183

(51) Int. Cl.
*H01M 6/10* (2006.01)
(52) U.S. Cl. ........ 429/163; 429/121; 429/168; 429/170; 429/209; 429/171
(58) Field of Classification Search .................. 429/209, 429/121, 163, 168, 170, 171
See application file for complete search history.

(56) References Cited

U.S. PATENT DOCUMENTS

| | | | |
|---|---|---|---|
| 7,736,800 B2 * | 6/2010 | Lee | 429/181 |
| 2004/0265701 A1 * | 12/2004 | Tsukamoto et al. | 429/338 |
| 2007/0026316 A1 | 2/2007 | Imachi et al. | |

FOREIGN PATENT DOCUMENTS

| | | |
|---|---|---|
| JP | 06-231749 | 8/1994 |
| JP | 07-161389 | 6/1995 |
| JP | 2001-297763 | 10/2001 |
| JP | 2002-246012 | 8/2002 |
| JP | 2003-257387 | 9/2003 |
| JP | 2007-035488 | 2/2007 |
| KR | 10-2004-0014585 A | 2/2004 |

\* cited by examiner

*Primary Examiner* — Jane Rhee
(74) *Attorney, Agent, or Firm* — McDermott Will & Emery LLP

(57) ABSTRACT

A nonaqueous electrolyte secondary battery includes: a positive electrode 4; a negative electrode 6; a separator 5; and a battery case 1 in which an electrode plate group 7 including the positive electrode 4 and the negative electrode 6 spirally wound or stacked with the separator 5 interposed therebetween is stored with an electrolyte. In the nonaqueous electrolyte secondary battery, after charging, when the separator 5 is removed to bring a surface of the positive electrode mixture layer and a surface of the negative electrode mixture layer in contact with each other, terminals are respectively provided on the positive electrode current collector and the negative electrode current collector and a resistance value between the terminals is measured, the resistance value is 1.6 Ω·cm² or more, and the battery case 1 is electrically insulated from the positive electrode 4 and the negative electrode 6.

10 Claims, 1 Drawing Sheet

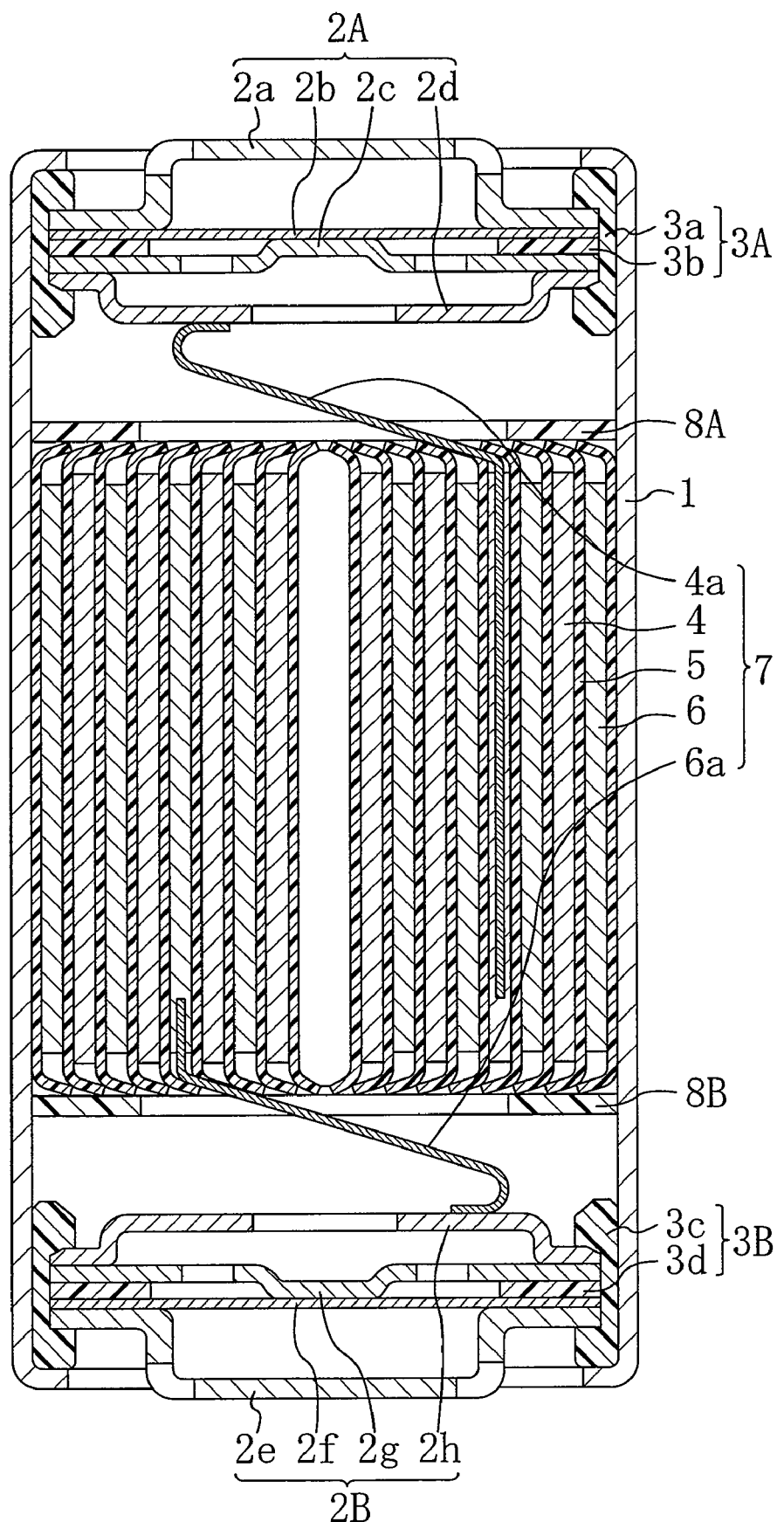

NONAQUEOUS ELECTROLYTE SECONDARY BATTERY

RELATED APPLICATIONS

This application is the U.S. National Phase under 35 U.S.C. §371 of International Application No. PCT/JP2008/000844, filed on Apr. 1, 2008, which in turn claims the benefit of Japanese Application No. 2007-105183, filed on Apr. 12, 2007, the disclosures of which Applications are incorporated by reference herein.

TECHNICAL FIELD

The present invention relates to a nonaqueous electrolyte secondary batteries such as a lithium ion secondary battery and the like, and more particularly relates to a technique for prevent overheating of a battery when the battery is internal short-circuited or the battery is damaged by nail sticking or crush.

BACKGROUND ART

In recent years, to meet demands for batteries for use in vehicle installation and demands for shift to direct current in large size devices out of consideration for environmental issues, the development of a compact and light secondary battery which is capable of fast charge and high current release has been desired. As a typical battery which meets such demands, there is a nonaqueous electrolyte secondary battery in which a lithium intercalation compound obtained by making carbon serving as a host material (which is herein a material capable of absorbing and releasing lithium ions) absorb an active material such as lithium metal, lithium alloy or the like, or lithium ions is used as a negative electrode active material and an aprotic organic solvent in which lithium salt such as $LiClO_4$, $LiPF_6$ or the like is dissolved is used as an electrolyte.

The nonaqueous electrolyte secondary battery includes a negative electrode in which the negative material is held by a negative electrode current collector serving as a support body, a positive electrode in which a positive electrode active material undergoing electrochemical reaction in a reversible fashion is held by a positive electrode current collector serving as a support body, and a separator which holds an electrolyte and is provided between the negative electrode and the positive electrode to prevent short-circuit from occurring in each of the electrodes.

The positive electrode and the negative electrode, each of which is formed into a sheet or a foil, are stacked in order with the separator interposed therebetween or are spirally wound with the separator interposed therebetween to serve as a heat generation element. Then, the heat generation element is stored in a battery case made of metal such as stainless steel, nickel plated iron, aluminum or the like. Then, after injecting an electrolyte into the battery case, a lid plate is sealed and fixed on an opening end portion of the battery case. Thus, a battery is formed.

A lithium ion secondary battery might possibly overheat due to electrical factors such as overcharge, environmental factors such as high temperature exposure, and mechanical factors such as damages caused by fall of a heavy load, and the like. As a method for testing whether a battery overheats due to mechanical factors, there is a method in which, assuming a most severe situation, besides dropping a heavy load onto the battery and adding vibration to the battery, an internal short-circuit is generated by sticking a nail ($\phi 5$) in a charged lithium ion secondary battery (in this method, an abuse stated in the SBA standard, in which a nail or the like is mistakenly stuck in a battery when the battery is packaged in wooden case is assumed). Results of tests conducted in such severe situations show that overheating of a lithium ion secondary battery is possibly caused in such situations.

As means for preventing overheating of a battery due to electrical factors or mechanical factors, a method in which an electric resistance of an active material is increased has been proposed (see, for example, Patent Document 1). Specifically, a method in which lithium-cobalt composite oxide of which a resistance coefficient when powder filling density is 3.8 g/cm is 1 mΩ·cm or more and 40 mΩ·cm or less is used as a positive electrode active material has been proposed.

Patent Document 1: Japanese Laid-Open Publication No. 2001-297763

DISCLOSURE OF THE INVENTION

Problems that the Invention is to Solve

However, even though an electric resistance of an active material is increased, with an increased amount of a conductive agent in a positive electrode mixture layer or with an electrode plate having a reduced thickness, a short-circuit current flowing when a short-circuit occurs becomes larger. Thus, it is difficult to effectively prevent a battery from overheating. On the other hand, with an electrode plate having a large thickness, the electric resistance of the positive electrode active material becomes high and the resistance of the electrode plate becomes too high, so that discharge performance is drastically dropped.

When the technique proposed in Patent Document 1 is adopted for a battery using a battery case made of, for example, aluminum for the purpose of weight reduction, the battery case made of aluminum has a potential. Therefore, when the battery is damaged due to mechanical factors such as sticking of a nail or crush, a short-circuit current flowing at a short-circuit point in an electrode plate group is reduced and, on the other hand, a short-circuit current is concentrated in the battery case which has a potential, so that overheating of the battery occurs.

In view of the above-described points, the present invention has been devised and it is therefore an object of the present invention to provide a nonaqueous electrolyte secondary battery of which overheating can be prevented when the battery is internal short-circuited or when the battery is damaged due to nail sticking or crush, even though a metal case containing aluminum is adopted in the battery for the purpose of weight reduction.

Solution to the Problems

To achieve the above-described object, a nonaqueous electrolyte secondary battery according to the present invention is characterized in that the nonaqueous electrolyte secondary battery includes: a positive electrode including a positive electrode current collector and a positive electrode mixture layer provided on surfaces of the positive electrode current collector and containing a positive electrode active material; a negative electrode including a negative electrode current collector and a negative electrode mixture layer provided on surfaces of the negative electrode current collector and containing a negative electrode active material; a separator provided between the positive electrode and the negative electrode; and a battery case in which an electrode plate group including the positive electrode and the negative electrode spirally wound or stacked with the separator interposed therebetween is stored with an electrolyte, and after charging, when the separator is removed to bring a surface of the positive electrode mixture layer and a surface of the negative electrode mixture layer in contact with each other, terminals are respectively provided on the positive electrode current collector and the negative electrode current collector and a resistance value between the terminals is measured, the resistance value is 1.6 Ω·cm² or more, and the battery case is electrically insulated from the positive electrode and the negative electrode.

In the nonaqueous electrolyte secondary battery of the present invention, the resistance between the positive electrode and the negative electrode is relatively large (specifically, satisfies the condition that the resistance is 1.6 Ω·cm²). Accordingly, even when the battery is internal short-circuited or the battery is damaged due to nail sticking or crush, the separator might be melted away but a large short-circuit current flowing between the positive electrode current collector and the negative electrode current collector can be suppressed, so that increase in temperature in the electrode plate group due to Joule heat is not caused.

Furthermore, since the battery case is electrically insulated from the positive electrode and the negative electrode, specifically, in a battery in which a metal case containing, for example, aluminum for the purpose of weight reduction and the like, the battery might be damaged due to nail sticking or crush but a short-circuit current flowing through the battery case can be suppressed, so that increase in temperature in the electrode plate group due to Joule heat is not caused.

Thus, overheating of the battery can be prevented without causing increase in temperature of the entire battery due to Joule heat. Therefore, a highly safe nonaqueous electrolyte secondary battery can be provided.

In the nonaqueous electrolyte secondary battery of the present invention, it is preferable that a positive electrode terminal is provided at one end of the battery case so as to be connected to the positive electrode via a positive electrode lead, while a negative electrode terminal is provided at the other end of the battery case so as to be connected to the negative electrode via a negative electrode lead, and the positive electrode terminal and the negative electrode terminal are electrically insulated from the battery case.

Thus, the battery case can be electrically insulated from the positive electrode and the negative electrode.

In the nonaqueous electrolyte secondary battery, it is preferable that the battery case is a metal case.

In the nonaqueous electrolyte secondary battery, it is preferable that the battery case contains aluminum.

Aluminum is light and chemically stable and does not cause a side reaction that adversely affects battery characteristics.

In the nonaqueous electrolyte secondary battery, it is preferable that the battery case is a laminate case.

In the nonaqueous electrolyte secondary battery, it is preferable that the positive electrode active material is a compound represented by a general formula $LiNi_xCo_yAl_{1-x-y}O_2$, an x value given in the general formula satisfies a relationship $0.7<x<1.0$, and a y value given in the general formula satisfies a relationship $0.0<y<0.3$.

In the nonaqueous electrolyte secondary battery, as described above, increase in temperature of the entire battery due to Joule heat is not caused and thus a positive electrode active material exhibiting flammability properties at low temperature can be used in a safe manner.

In the nonaqueous electrolyte secondary battery, it is preferable that the negative electrode active material is a compound represented by a general formula $SiO_x$ and an x value given in the general formula satisfies a relationship $0<x<2$.

In the nonaqueous electrolyte secondary battery, as described above, increase in temperature of the entire battery due to Joule heat is not caused and thus a positive electrode active material exhibiting flammability properties at low temperature can be used in a safe manner.

In the nonaqueous electrolyte secondary battery, it is preferable that the positive electrode active material is a phosphate compound having an olivine structure and represented by a general formula $Li_xFe_{1-y}M_yPO_4$ ($0<x\leq1$, $0\leq y\leq0.3$), and M given in the general formula is any one element of Nb, Mg, Ti, Zr, Ta, W, Mn, Ni and Co.

Effects of the Invention

In the nonaqueous electrolyte secondary battery of the present invention, the resistance between the positive electrode and the negative electrode is relatively large (specifically, satisfies the condition that the resistance is 1.6 Ω·cm²). Accordingly, even when the battery is internal short-circuited or the battery is damaged due to nail sticking or crush, the separator might be melted away but a large short-circuit current flowing between the positive electrode current collector and the negative electrode current collector can be suppressed, so that increase in temperature in the electrode plate group due to Joule heat is not caused.

Furthermore, since the battery case is electrically insulated from the positive electrode and the negative electrode, specifically, in a battery in which a metal case containing, for example, aluminum for the purpose of weight reduction and the like, the battery might be damaged due to nail sticking or crush but a short-circuit current flowing through the battery case can be suppressed, so that increase in temperature in the electrode plate group due to Joule heat is not caused.

Thus, overheating of the battery can be prevented without causing increase in temperature of the entire battery due to Joule heat. Therefore, a highly safe nonaqueous electrolyte secondary battery can be provided.

BRIEF DESCRIPTION OF THE DRAWINGS

FIG. 1 is a cross-sectional view illustrating a structure of a nonaqueous electrolyte secondary battery according to the present invention.

| EXPLANATION OF REFERENCE NUMERALS | |
| --- | --- |
| 1 | Battery case |
| 2A | Positive electrode sealing plate |
| 2a | Metal cap |
| 2b | Metal explosion protection valve |
| 2c | Metal thin valve |
| 2d | Metal filter |
| 2B | Negative electrode sealing plate |
| 2e | Metal cap |
| 2f | Metal explosion prevention valve |
| 2g | Metal thin valve |
| 2h | Metal filter |
| 3A | Gasket |
| 3a | Outer gasket |
| 3b | Inner gasket |
| 3B | Gasket |
| 3c | Outer gasket |
| 3d | Inner gasket |
| 4 | Positive electrode |
| 4a | Positive electrode lead |
| 5 | Separator |
| 6 | Negative electrode |
| 6a | Negative electrode lead |
| 7 | Electrode plate group |
| 8A | Positive electrode insulation plate |
| 8B | Negative electrode insulation plate |

BEST MODE FOR CARRYING OUT THE INVENTION

Hereinafter, a nonaqueous electrolyte secondary battery according to the present invention will be described. Note that in the following description, as a nonaqueous electrolyte secondary battery, a lithium ion secondary battery will be described as a specific example.

A nonaqueous electrolyte secondary battery according to the present invention has the following two features:

1) A resistance between a positive electrode current collector and a negative electrode current collector is set to be 1.6 $\Omega \cdot cm^2$ or more.
2) A battery case is electrically insulated from a positive electrode and a negative electrode.

As described in 1), assume that a resistance between a positive electrode current collector and a negative electrode current collector is to be 1.6 $\Omega \cdot cm^2$ or more. Thus, when a battery is internal short-circuited or when a battery is damaged due to nail sticking or crush, a separator might be melted away but a short-circuit current flowing between the positive electrode current collector and the negative electrode current collector through a positive electrode mixture layer and a negative electrode mixture layer is suppressed, so that increase in temperature in an electrode plate group due to Joule heat is not caused According to 2), a battery case is electrically insulated from a positive electrode and a negative electrode. Thus, particularly, in the case where a battery employs a metal case containing, for example, aluminum for the purpose of weight reduction and the like, the battery might be damaged due to nail sticking or crush but a short-circuit current flowing through the battery case is suppressed, so that increase in temperature of the battery case due to Joule heat is not caused.

Accordingly, a highly safe nonaqueous electrolyte secondary battery in which overheating of the battery is prevented without increasing the temperature of the entire battery due to Joule heat can be provided by taking both of the measures of 1) and 2).

—Resistance between Positive Electrode Current Collector and Negative Electrode Current Collector—

Next, the definition of a resistance between a positive electrode current collector and a negative electrode current collector will be described. "A resistance between a positive electrode current collector and a negative electrode current collector" means 1 KHz impedance between a positive electrode current collector and a negative electrode current collector in a state where a positive electrode and a negative electrode are attached to each other without a separator interposed therebetween and a pressure of $9.8 \times 10^5$ N/m$^2$ is applied. Note that when an additive is added to a separator or an electrolyte, "a resistance between a positive electrode current collector and a negative electrode current collector" means 1 KHz impedance between a positive electrode current collector and a negative electrode current collector in a state where the additive of a predetermined amount is provided between a positive electrode and a negative electrode and a pressure of $9.8 \times 10^5$ N/m$^2$ is applied.

The resistance between a positive electrode current collector and a negative electrode current collector can be divided into contact resistance component between a positive electrode current collector and a mixture layer, electric resistance component of a positive electrode mixture layer, contact resistance component between the positive electrode and a negative electrode, electric resistance component of a negative electrode layer and contact resistance component between the negative electrode current collector and a mixture layer.

In the present invention, detailed components of the resistance, i.e., each resistance component is not particularly limited. A total resistance of each resistance component may be 1.6 $\Omega \cdot cm^2$ or more.

To realize a resistance of 1.6 $\Omega \cdot cm^2$ or more between a positive electrode current collector and a negative electrode current collector, the following methods a) through d) can be used.

a) As a positive electrode active material, for example, a high resistance positive electrode active material represented by LiFePO$_4$, LiMn$_2$O$_4$ or the like is used.

b) As a negative electrode active material, for example, a high resistance negative electrode active material such as SiO$_x$ (0<x<2) or the like is used.

c) The amount of a conductive agent contained in a positive electrode is reduced.

d) An insulation material which does not contribute to charge and discharge of a battery is added to at least one of a positive electrode and a negative electrode (specifically, for example, the amount of a binder contained in the positive electrode is increased or the amount of a binder contained in the negative electrode is increased.

As the binder of the positive electrode or the negative electrode which can be added as an insulation material, for example, PVDF, polytetrafluoroethylene, polyethylene, polypropylene, aramid resin, polyamide, polyimide, polyamide imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyethersulfone, hexafluoropolypropylene, styrene butadiene rubber, carboxymethylcellulose or the like can be used. Also, copolymer including combined two or more monomers selected from the group consisting of tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid and hexadiene may be used or a mixture of two or more selected from the above-described group may be used.

As an insulation material exhibiting an excellent heat resistance, selected one from the group consisting of oxide, nitride, carbide and the like may be independently used or a combination of two or more selected from the above-described group may be used. Among those materials, oxide is preferable in view of availability and the like. As such oxide, alumina (aluminum oxide), titania (titanium oxide), zirconia (zirconium oxide), magnesia (magnesium oxide), zirc oxide, silica (silicon oxide) or the like can be used.

—Electrical Insulation of Battery Case from Positive and Negative Electrodes—

Particularly, in the case where a battery employs a metal case containing, for example, aluminum for the purpose of weight reduction and the like, even when the battery is damaged due to mechanical factors such as nail sticking, crush or the like, a short-circuit current flowing through the battery case is suppressed by electrically insulating a battery case in which an electrode plate group is stored from a positive electrode and a negative electrode.

As a material for the metal case, for example, aluminum, iron, stainless steel, magnesium or the like can be used. Among those, aluminum is light and chemically stable and does not cause a side reaction that adversely affects battery characteristics. Therefore, aluminum is the most preferable as a material for the metal case.

Note that the reason why a battery in which a battery case is insulated from a positive electrode (see a battery 5 formed in Comparative Example 1 which will be described later) exhibits a greater effect in suppressing a short-circuit current flowing through the battery case than that of a battery in which a battery case is insulated from a negative electrode (see a battery 6 formed in Comparative Example 2 which will be described later) will be hereinafter described.

In general, a lithium ion secondary battery is formed using aluminum for a positive electrode current collector and copper for a negative electrode current collector. The melting point of aluminum is 660° C. and the melting point of copper is 1100° C. The melting point of aluminum as the positive electrode current collector is lower than that of copper as the negative electrode current collector. Therefore, for example, when a nail is stuck in the battery, aluminum as the positive electrode current collector is melted by Joule heat due to a short-circuit current in a shorter time, compared to copper as the negative electrode current collector, and then electrical conduction with the nail is cut off.

For this reason, in a battery employing a battery case with a negative electrode potential (in other words, a battery in which a battery case is isolated from a positive electrode), the melting point of aluminum is relatively low and a short-circuit current flowing between the positive electrode current corrector and the battery case through the nail is relatively small, so that the amount of heat generated in the battery is small. On the other hand, in a battery employing a battery case with a negative electrode potential (in other words, a battery in which a battery case is isolated from a negative electrode), the melting point of copper as a negative electrode current collector is relatively high, a short-circuit current flowing between the negative electrode current collector and the battery case through the nail is relatively large, so that the amount of heat generated is large. Therefore, a battery in which a battery case is isolated from a positive electrode exhibits a greater effect in suppressing a short-circuit current flowing through the battery case.

As has been described, a nonaqueous electrolyte secondary battery of the present invention has a structure exhibiting the following features 1) and 2).

1) A resistance between a positive electrode current collector and a negative electrode current collector is set to be 1.6 $\Omega \cdot cm^2$ or more.
2) A battery case is electrically insulated from a positive electrode and a negative electrode.

Other part of the structure is not particularly limited.

Hereinafter, a positive electrode, a negative electrode, a separator and a nonaqueous electrolyte forming a nonaqueous electrolyte secondary battery according to the present invention will be described in detail.

—Positive Electrode—

Normally, a positive electrode includes a positive electrode current collector and a positive electrode mixture layer supported by the positive electrode current corrector. The positive electrode mixture layer can contain, in addition to a positive electrode active material, a binder, a conductive agent and the like. The positive electrode is formed by preparing a positive electrode mixture slurry, applying the positive electrode mixture slurry to the positive electrode current collector and then drying the positive electrode mixture slurry.

As the positive electrode active material of the nonaqueous electrolyte secondary battery of the present invention, a lithium composite metal oxide can be used. Examples of lithium composite metal oxide include, for example, $Li_xCoO_2$, $Li_xNiO_2$, $Li_xMnO_2$, $Li_xCo_yNi_{1-y}O_2$, $Li_xCo_yM_{1-y}O_2$, $Li_xNi_{1-y}M_yO_z$, $Li_xMn_2O_4$, $Li_xMn_{2-y}M_yO_4$, $LiMePO_4$ and $Li_2MePO_4F$. Herein, M is at least one selected from the group consisting of Na, Mg, Sc, Y, Mn, Fe, Co, Ni, Cu, Zn, Al, Cr, Pb, Sb and B and x=0 to 1.2, Y=0 to 0.9 and z=2.0 to 2.3, hold. Note that an x value indicating the mole ratio of Li is a value measured right after the positive electrode active material and is increased/reduced by charging/discharging. Moreover, part of Li contained in the lithium composite metal oxide may be replaced with a different element. Surface processing may be performed to a surface of the battery using metal oxide, lithium oxide, a conductive agent and the like or the surface of the battery may be hydrophobized.

As the conductive agent, for example, graphites such as natural graphite, artificial graphite and the like, carbon blacks such as acetylene black, ketchen black, channel black, furnace black, lamp black, thermal black and the like, conductive fibers such as carbon fiber, metal fiber and the like, metal powders such as fluorocarbon, aluminum and the like, conductive whiskers such as zinc oxide, kalium titanate and the like, conductive metal oxide such as titanium oxide and the like and organic conductive materials such as phenylene derivative and the like can be used.

As the positive electrode current collector, a long porous conductive substrate or a nonporous conductive substrate is used. As a material used for the conductive substrate, for example, stainless steel, aluminum, titanium or the like may be used. The thickness of the positive electrode current collector is not particularly limited but is preferable in a range of 1 to 500 µm and more preferably in a range of 5 to 20 µm. By forming the positive electrode current collector to have a thickness in the above-described range, the strength of an electrode plate can be maintained and also the weight of the electrode plate can be reduced.

Respective compounding ratios of the positive electrode active material, the conductive agent and the binder are preferably 80 wt % to 99 wt % for the positive electrode active material, 0.3 wt % to 20 wt % for the conductive agent and 0.7 wt % to 10 wt % for the binder.

—Negative Electrode—

Normally, a negative electrode includes a negative electrode current collector and a negative electrode mixture layer supported by the negative electrode current collector. The negative mixture layer can contain, in addition to a negative electrode active material, a binder and the like. The negative electrode is formed by preparing a negative electrode mixture slurry, applying the negative electrode mixture slurry to the negative electrode current collector and then drying the negative electrode mixture slurry.

As the negative electrode active material of the nonaqueous electrolyte secondary battery of the present invention, for example, metal, metal fiber, carbon materials, oxide, nitride, tin compound, silicon compound, various types of alloy materials or the like can be used. Specifically, an elemental substance such as tin (Sn), silicon (Si) or the like or an alloy, a compound or a solid solution of a tin compound, a silicon compound or the like is preferable because of their large capacity density. As a carbon material, for example, various types of natural graphite, coke, half-graphitized carbon, carbon fiber, spherical carbon, various types of artificial graphite or the like can be used. As a silicon compound, $SiO_x$ (0.05<x<1.95), an alloy, a compound, a solid solution or the like obtained by replacing part of Si with at least one element selected from the group consisting of B, Mg, Ni, Ti, Mo, Co, Ca, Cr, Cu, Fe, Mn, Nb, Ta, V, W, Zn, C, N and Sn can be used.

As a tin compound, $Ni_2Sn_4$, $Mg_2Sn$, $SnO_x$ (0<x<2), $SnO_2$, $SnSiO_3$ or the like can be used. One of these negative electrode active materials may be independently used or a combination of two or more of these negative electrode active materials may be used.

As the negative electrode current collector, a long porous conductive substrate or a nonporous conductive substrate is used. As a material used for the conductive substrate, for example, stainless steel, nickel, copper or the like is used. The thickness of the negative electrode current collector is not particularly limited but is preferably in a range of 1 to 500 μm and is more specifically in a range of 5 to 20 μm. By forming the negative electrode current collector to have a thickness in the above-described range, the strength of an electrode plate can be maintained and also the weight of the electrode plate can be reduced.

Respective compounding ratios of the negative electrode active material, the conductive agent and the binder are preferably 93 wt % to 99.5 wt % for the negative electrode active material and 0.5 wt % to 10 wt % for the binder.

—Separator—

As a separator provided between a positive electrode and a negative electrode, a microporous thin film, woven fabric, nonwoven fabric or the like having a large ion transmittance, a predetermined mechanical strength and insulation property is used. As a material for the separator, for example, polyolefin such as polypropylene, polyethylene and the like has an excellent durability and the shut down function and thus is preferable in view of safety of a battery. The thickness of the separator is, in general, 10 to 300 μm but is preferably 40 μm or less. The thickness of the separator is more preferably in a range of 10 to 30 μm and further more preferably in a range of 15 to 25 μm. The microporous thin film may be a single layer film formed of a single material or may be a composite film or a multilayer film formed of one or more materials. Moreover, the open pore ratio of the separator is preferably in a range of 30% to 70% and more preferably in a range of 35% to 60%. Herein, "open pore ratio" means volume ratio of pore potions of the separator to the whole volume of the separator.

—Nonaqueous Electrolyte—

As a nonaqueous electrolyte, a liquid, gel or solid state nonaqueous electrolyte can be used.

A liquid nonaqueous electrolyte (nonaqueous electrolytic solution) contains an electrolyte (for example, lithium salt) and a nonaqueous solvent with which the electrolyte is dissolved.

A gel nonaqueous electrolyte contains a nonaqueous electrolyte and a high-polymer material for holding the nonaqueous electrolyte. As a high-polymer material, for example, polyvinylidene fluoride, polyacrylonitrile, polyethylene oxide, polyvinyl chloride, polyacrylate, polyvinylidene fluoride hexafluoropropylene, or the like is preferably used.

A solid nonaqueous electrolyte contains a high-polymer solid electrolyte.

Now, the nonaqueous electrolytic solution will be hereinafter described in detail.

As a nonaqueous solvent to dissolve an electrolyte, a known nonaqueous solvent can be used. A type of the nonaqueous solvent is not particularly limited. For example, cyclic carbonic acid ester, chain carbonic acid ester, cyclic carboxylic acid ester or the like is used. Herein, examples of cyclic carbonic acid ester include propylene carbonate (PC), ethylene carbonate (EC) and the like. Examples of cyclic carbonic acid ester include diethyl carbonate (DEC), ethyl methyl carbonate (EMC), dimethyl carbonate (DMC) and the like. Examples of the cyclic carbon acid ester include γ-butyrolactone (GBL), γ-valerolactone (GVL) and the like. One of these nonaqueous solvents may be independently used or a combination of two or more of these nonaqueous solvents may be used.

As an electrolyte to be dissolved with the nonaqueous solvent, for example, $LiClO_4$, $LiBF_4$, $LiPF_6$, $LiAlCl_4$, $LiSbF_6$, $LiSCN$, $LiCF_3SO_3$, $LiCF_3CO_2$, $LiAsF_6$, $LiB_{10}Cl_{10}$, lower aliphatic series lithium carboxylate, LiCl, LiBr, LiI, chloroborane lithium, borate salts, imide salts and the like can be used. Examples of borate salts include bis(1,2-bezenediolate(2-)-O,O')lithium borate, bis(2,3-naphthalenediolate (2-)-O,O')lithium borate, bis(2,2'-biphenyldiolate(2-)O,O') lithium borate, bis(5-fluoro-2-olate-1-benzenesulfonate-O, O')lithium borate and the like. Examples of imide salts include lithium bistrifluoromethanesulfonate imide (($CF_3SO_2)_2NLi$), lithium trifluoromethanesulfonate nonafluorobutanesulfonate imide ($LiN(CF_3SO_2)(C_4F_9SO_2)$), lithium bispentafluoroethanesulfonate imide (($C_2F_5SO_2)_2$ NLi) and the like. One of these electrolytes may be independently used or a combination of two or more of these electrolytes may be used. The amount of the electrolyte to be dissolved with the nonaqueous solvent is preferably in a range of 0.5 to 2 mol/L.

Moreover, the nonaqueous electrolyte may contain an additive which is decomposed on the negative electrode to form a capsule having a high lithium ion conductivity and increases a coulombic efficiency of a battery. Examples of an additive having the above-described function include, for example, vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenilvinylene carbonate, vinylethylene carbonate (VEC), divinylethylene carbonate and the like. One of these compounds may be independently used or a combination of two or more of these compounds may be used. Specifically, of the above-described compounds, at least one compound selected from the group consisting of vinylene carbonate, vinylethylene carbonate and divinylethylene carbonate is preferably used. Note that part of hydrogen atoms of each of the above-described compounds may be substituted with fluorine atoms.

Furthermore, the nonaqueous electrolyte may contain a known benzene derivative which is decomposed at a time of overcharge to form a capsule on electrode plates and deactivates a battery. As the benzene derivative having the above-described function, a benzene derivative including a phenyl group or a benzene derivative including a cyclic compound group adjacent to a phenyl group is preferable. Examples of the cyclic compound group include a phenyl group, a cyclic ether group, a cyclic ester group, a cycloalkyl group, a phenoxy group and the like. Specific examples of the benzene derivative include cyclohexyl benzene, biphenyl, diphenyl ether and the like. One of these derivatives may be independently used or a combination of two or more of these derivatives may be used. Note that a content of the benzene derivative in the nonaqueous solvent is preferably 10 vol % or less of the entire nonaqueous solvent.

—Nonaqueous Electrolyte Secondary Battery—

Hereinafter, as a structure of a nonaqueous electrolyte secondary battery according to the present invention, a cylindrical nonaqueous electrolyte secondary battery will be described as a specific example with reference to FIG. 1. FIG. 1 is a cross-sectional view illustrating a structure of a nonaqueous electrolyte secondary battery according to the present invention.

The nonaqueous electrolyte secondary battery of FIG. 1 includes a battery case 1 and an electrode plate group 7 stored in the battery case 1. The electrode plate group 7 is formed of a positive electrode 4, a negative electrode 6 and a separator 5 made of polyethylene and the positive electrode 4 and the negative electrode 6 are spirally wound with the separator 5 interposed therebetween. On an upper edge of the electrode plate group 7, a positive electrode insulation plate 8A is provided, and on a lower edge of the electrode plate group 7, a negative electrode insulation plate 8B is provided. A positive electrode sealing plate 2A (specifically, which is formed of a metal cap 2a, a metal explosion protection valve 2b, a metal thin valve 2c and a metal filter 2d) is laser-molded onto an opening upper edge portion of the battery case 1 with a gasket 3A (specifically, which is formed of an outer gasket 3a and an inner gasket 3b) interposed therebetween. On the other hand, a negative electrode sealing plate 2B (specifically, which is formed of a metal cap 2e, a metal explosion prevention valve 2f, a metal thin valve 2g and a metal filter 2h) is laser-welded to an opening lower edge portion of the battery case 1 with a gasket 3B (specifically, which is formed of an outer gasket 3c and an inner gasket 3d) interposed therebetween. Moreover, one end of a positive electrode lead 4a made of aluminum is attached to the positive electrode 4 and the other end of the positive electrode lead 4a is lo connected to the positive sealing plate 2A serving also as a positive electrode terminal. On the other hand, one end of a negative electrode lead 6a made of copper is attached to the negative electrode 6 and the other end of the negative electrode lead 6a is connected to the negative electrode sealing plate 2B serving also as a negative electrode terminal.

Hereinafter, working examples will be described.

WORKING EXAMPLE 1

Hereinafter, a battery according to Working Example 1 will be described. Features of the battery of this working example are following points: a resistance value between positive electrode current collector and a negative electrode current collector was set to be 1.6 $\Omega \cdot cm^2$ by using $LiNi_{0.80}Co_{0.10}Al_{0.10}O_2$ (exhibiting flammability properties at a low temperature), which was a low resistance positive electrode active material, as a positive electrode active material and acetylene black in 1.25 weight parts or less as a conductive agent; and a battery case was electrically insulated from a positive electrode and a negative electrode.

(1) Forming of Positive Electrode

Acetylene black in 0.6 weight parts as a conductive agent and a solution obtained by dissolving polyvinylidene fluoride (PVDF) in 2.7 weight parts as a binder with an N-methyl pyrrolidone (NMP) solvent medium were mixed. Thereafter, $LiNi_{0.80}Co_{0.10}Al_{0.10}O_2$ in 100 weight parts as a positive electrode active material was mixed in the mixture solution, thereby obtaining a paste (positive electrode mixture slurry) containing a positive electrode mixture. The paste was applied to both surfaces of an aluminum foil (positive electrode current collector) having a thickness of 15 μm and dried. Then, the aluminum foil with the paste applied was rolled to a thickness of 0.125 mm and cut to form a positive electrode having a width of 57 mm and a length of 667 mm.

(2) Forming of Negative Electrode

First, scale-like artificial graphite in 100 weight parts was pulverized and classified so that an average particle diameter becomes about 20 μm.

Next, scale-like artificial graphite in 100 weight parts as a negative electrode active material and styrene-butadiene rubber in 3 weight parts and carboxymethyl cellulose in 1 wt % together as a binder were added to water and mixed all, thereby obtaining a paste (negative electrode mixture slurry) containing a negative electrode mixture. The paste is applied to both surfaces of a copper foil (negative electrode current collector) having thickness of 8 μm and dried. Then, the copper foil with the paste applied was rolled to a thickness of 0.156 mm and cut to form a negative electrode having a width of 58.5 mm and a length of 750 mm.

(3) Preparation of Nonaqueous Electrolyte

Vinylene carbonate (VC) in 5 wt % as an additive was added to a mixture solvent, as a nonaqueous solvent, containing ethylene carbonate (EC) and dimethyl carbonate (DMC) at a volume ratio of 1:3 and $LiPF_6$ as an electrolyte was dissolved with the mixture solvent so that the $LiPF_6$ concentration becomes 1.4 mol/m$^3$, thereby obtaining a nonaqueous electrolyte.

(4) Forming of Nonaqueous Electrolyte Secondary Battery

First, a positive electrode lead (see 4a in FIG. 1) made of aluminum was attached to a positive electrode (see 4 in FIG. 1) and a negative electrode lead (see 6a in FIG. 1) made of nickel was attached to a negative electrode (see 6 in FIG. 1). Thereafter, the positive electrode and the negative electrode were wound with a separator (see 5 in FIG. 1) made of polyethylene interposed between the positive electrode and the negative electrode, thereby forming an electrode plate group (see 7 in FIG. 1).

Next, the electrode plate group was inserted in a cylindrical battery case (see 1 in FIG. 1) made of 3003 aluminum alloy and having opening edge portions at upper and lower edges, respectively. Thereafter, a positive electrode insulation plate (see 8A in FIG. 1) was provided on an upper edge portion of the electrode plate and a negative electrode insulation plate (see 8B in FIG. 1) was provided on a power edge portion of the electrode plate group. Then, a negative electrode sealing plate (see 2B in FIG. 1) was laser-welded to one of the opening edge portions of the battery case located at a negative electrode terminal side with a gasket (see 3B in FIG. 1) interposed therebetween. Thereafter, a nonaqueous electrolyte was injected into the battery case from the other one of the opening edge portions of the battery case located at a positive electrode terminal side by reduction in pressure. Then, a positive electrode sealing plate (see 2A in FIG. 1) was laser-welded to the other end of the battery case located at the positive electrode terminal side with a gasket (see 3A in FIG. 1) interposed therebetween, thereby forming a cylindrical nonaqueous electrolyte secondary battery. The battery obtained in the above-described manner was referred to as the battery 1.

WORKING EXAMPLE 2

Hereinafter, a battery according to Working Example 2 will be described. Features of the battery of this working example are following points: a resistance value between a positive electrode current collector and a negative electrode current collector was set to be 4.0 $\Omega \cdot cm^2$ by using $LiNi_{0.80}Co_{0.10}Al_{0.10}O_2$, which was a low resistance positive electrode active material, as a positive electrode active material, acetylene black in 1.25 weight parts or less as a conductive agent, and polyvinylidene fluoride in 2.7 weight parts or more as a binder; and a battery case was electrically insulated from a positive electrode and a negative electrode. That is, in contrast to Working Example 1 in which the resistance value between the positive electrode current collector and the negative electrode current collector was set to be 1.6 $\Omega \cdot cm^2$ by using $LiNi_{0.80}Co_{0.10}Al_{0.10}O_2$ (exhibiting flammability properties at a low temperature), which was a low resistance positive electrode active material, as a positive electrode active material, the resistance value was set to be 4.0 $\Omega \cdot cm^2$.

Specifically, acetylene black in 0.6 weight parts as a conductive agent and a solution obtained by dissolving polyvinylidene fluoride in 3.7 weight parts as a binder with an N-methyl pyrrolidone solvent medium were mixed. Thereafter, $LiNi_{0.80}Co_{0.10}Al_{0.10}O_2$ in 100 weight parts as a positive electrode active material was mixed in the mixture solution, thereby obtaining a paste containing a positive electrode mixture. The paste was applied to both surfaces of an aluminum foil having a thickness of 15 μm and dried, and then, the aluminum foil with the paste applied was rolled to a thickness of 0.125 mm and cut to form a positive electrode having a width of 57 mm and a length of 667 mm. Except what described above (i.e., except that polyvinylidene fluoride not in 2.7 weight parts but 3.7 weight parts was used as a binder), in the same manner as in Working Example 1, a cylindrical nonaqueous electrolyte secondary battery was formed. The obtained battery was referred to as the battery 2.

WORKING EXAMPLE 3

Hereinafter, a battery according to Working Example 3 will be described. Features of the battery of this working example are following points: a resistance value between a positive electrode current collector and a negative electrode current collector was set to be 1.6 $\Omega \cdot cm^2$ by using SiO, which was a high resistance negative electrode active material, as a negative electrode active material; and a battery case was electrically insulated from a positive electrode and a negative electrode.

(1) Forming of Positive Electrode

Acetylene black in 1.2 weight parts as a conductive agent and a solution obtained by dissolving polyvinylidene fluoride in 1.7 weight parts as a binder with an N-methyl pyrrolidone solvent medium were mixed. Thereafter, $LiNi_{0.80}Co_{0.10}Al_{0.10}O_2$ in 100 weight parts as a positive electrode active material was mixed in the mixture solution, thereby obtaining a paste containing a positive electrode mixture. The paste was applied to both surfaces of an aluminum foil having a thickness of 15 μm and dried. Then, the aluminum foil with the paste applied was rolled to a thickness of 0.125 mm and cut to form a positive electrode having a width of 57 mm and a length of 667 mm.

(2) Forming of Negative Electrode

Next, SiO in 100 weight parts as a negative electrode active material and polyvinylidene fluoride in 2 weight parts as a binder were mixed, thereby obtaining a paste containing a negative electrode mixture. The paste is applied to both surfaces of a copper foil having thickness of 8 μm and dried. Then, the copper foil with the paste applied was rolled to a thickness of 0.156 mm and cut to form a negative electrode having a width of 58.5 mm and a length of 750 mm.

The battery formed in the same manner as Working Example 1, except for (1) forming of positive electrode and (2) forming of negative electrode, i.e., using the same battery formation steps as (3) preparation of nonaqueous electrolyte and (4) forming of nonaqueous electrolyte secondary battery in Working Example 1 was referred to as the battery 3.

WORKING EXAMPLE 4

Hereinafter, a battery according to Working Example 4 will be described. Features of the battery of this working example are following points: $LiFePO_4$ which was a high resistance positive electrode active material was used as a positive electrode active material, thereby setting a resistance value between a positive electrode current collector and a negative electrode current collector to be 1.6 $\Omega \cdot cm^2$; and a battery case was electrically insulated from a positive electrode and a negative electrode.

Specifically, acetylene black in 3 weight parts as a conductive agent and a solution obtained by dissolving polyvinylidene fluoride in 1.7 weight parts as a binder with an N-methyl pyrrolidone solvent medium were mixed. Thereafter, $LiFePO_4$ in 100 weight parts as a positive electrode active material was mixed in the mixture solution, thereby obtaining a paste containing a positive electrode mixture. The paste was applied to both surfaces of an aluminum foil having a thickness of 15 μm and dried, and then, the aluminum foil with the paste applied was rolled to a thickness of 0.125 mm and cut to form a positive electrode having a width of 57 mm and a length of 667 mm. Except for what described above (i.e., except that in (1) Forming of positive electrode in Working Example 1, not a low resistance positive electrode active material but a high resistance positive electrode active material was used as a positive electrode active material, acetylene black not in 0.6 weight parts but in 3 weight parts was used as a conductive agent, and polyvinylidene fluorine not in 2.7 weight parts but 1.7 weight parts was used as a binder), a cylindrical nonaqueous electrolyte secondary battery was formed in the same manner as in Working Example 1. The obtained battery was referred to as the battery 4.

COMPARATIVE EXAMPLE 1

Differences between this comparative example and the above-described Working Example 1 are the following points. In Working Example 1, the battery in which the battery case was insulated from each of the positive electrode and the negative electrode was formed. In contrast, in this comparative example, a battery in which a battery case was insulated from only a positive electrode was formed.

Specifically, an electrode plate group was formed in the same manner as in (4) Forming nonaqueous electrolyte secondary battery of Working Example 1 after performing (1) Forming of positive electrode, (2) Forming of negative electrode and (3) Preparation of nonaqueous electrolyte of Working Example 1.

Next, the electrode plate group was inserted in a cylindrical battery case made of cold-rolled steel plate (SPCD) and having an opening edge portion located at one edge. Thereafter, a positive electrode insulation plate was provided on an upper edge portion of the electrode plate group and, on the other hand, a negative electrode insulation plate is provided on a lower edge portion of the electrode plate group. Then, a negative electrode lead was welded to the battery case and, on the other hand, a positive electrode lead was welded to a positive electrode sealing plate. Thereafter, a nonaqueous electrolyte was injected into the battery case from an opening edge portion located at a positive electrode terminal side of the battery case by reduction in pressure. Then, the positive electrode sealing plate was crimped at an opening edge portion of the battery case located at a positive electrode terminal side with a gasket interposed therebetween. Thus, a cylindrical nonaqueous electrolyte secondary battery was obtained. The battery formed in the same manner as in Working Example 1, except for the point that it was formed to have a different structure for storing the electrode plate group in the battery case, as described above, was referred to the battery 5.

COMPARATIVE EXAMPLE 2

A difference of this comparative example from the above-described Working Example 1 is the following point. In Working Example 1, a battery in which the battery case was insulated from each of the positive electrode and the negative electrode was formed. In contrast, a battery in which a battery case was insulated from only a negative electrode was formed in this comparative example.

Specifically, an electrode plate group was formed in the same manner as in (4) Forming of a nonaqueous electrolyte secondary battery after performing (1) Forming of positive electrode, (2) Forming of negative electrode and (3) Preparation of nonaqueous electrolyte of Working Example 1.

Next, the electrode plate group was inserted in a cylindrical battery case made of 3003 aluminum alloy and having an opening edge portion located at one edge. Thereafter, a positive electrode insulation plate was provided on an upper edge portion of the electrode plate and, on the other hand, a negative electrode insulation plate was provided on a power edge portion of the electrode plate group. Then, a positive electrode lead was welded to the battery case and, on the other hand, a negative electrode lead was welded to a negative electrode sealing plate. Thereafter, a nonaqueous electrolyte was injected into the battery case from an opening edge portion located at a negative electrode terminal side of the battery case by reduction in pressure. Then, the negative electrode sealing plate was crimped at an opening edge portion of the battery case located at the negative electrode terminal side with a gasket interposed therebetween. Thus, a cylindrical nonaqueous electrolyte secondary battery was obtained. The battery formed in the same manner as in Working Example 1, except for the point that it has a different structure for storing the electrode plate group into the battery case, as described above, was referred to the battery 6.

COMPARATIVE EXAMPLE 3

A difference of this comparative example from the above-described Comparative Example 1 is the following point. In Comparative Example 1, the resistance value between the positive electrode current collector and the negative electrode current collector was set to be 1.6 $\Omega \cdot cm^2$. In contrast, the resistance value was set to be 1.2 $\Omega \cdot cm^2$ in this comparative example.

Specifically, acetylene black in 0.6 weight parts as a conductive agent and a solution obtained by dissolving polyvinylidene fluoride in 1.7 weight parts as a binder with an N-methyl pyrrolidone solvent medium were mixed. Thereafter, $LiNi_{0.80}Co_{0.10}Al_{0.10}O_2$ in 100 weight parts as a positive electrode active material was mixed in the mixture solution, thereby obtaining a paste containing a positive electrode mixture. The paste was applied to both surfaces of an aluminum foil having a thickness of 15 μm and dried, and then, the aluminum foil with the paste applied was rolled to a thickness of 0.125 mm and cut to form a positive electrode having a width of 57 mm and a length of 667 mm. Except for what described above (i.e., except that polyvinylidene fluoride not in 2.7 weight parts but 1.7 weight parts was used as a binder), a cylindrical nonaqueous electrolyte secondary battery was formed in the same manner as in Working Example 1. The obtained battery was referred to as the battery 7.

COMPARATIVE EXAMPLE 4

A difference of this comparative example from the above-described Comparative Example 1 is the following point. In Comparative Example 1, a resistance value between a positive electrode current collector and a negative electrode current collector was set to be 1.6 $\Omega \cdot cm^2$ by using $LiNi_{0.80}Co_{0.10}Al_{0.10}O_2$ as a positive electrode active material. In contrast, the resistance value was set to be 0.2 $\Omega \cdot cm^2$ in this comparative example.

Specifically, acetylene black in 1.2 weight parts as a conductive agent and a solution obtained by dissolving polyvinylidene fluoride in 1.7 weight parts as a binder with an N-methyl pyrrolidone solvent medium were mixed. Thereafter, $LiNi_{0.80}Co_{0.10}Al_{0.10}O_2$ in 100 weight parts as a positive electrode active material was mixed in the mixture solution, thereby obtaining a paste containing a positive electrode mixture. The paste was applied to both surfaces of an aluminum foil having a thickness of 15 μm and dried, and then, the aluminum foil with the paste applied was rolled to a thickness of 0.125 mm and cut to form a positive electrode having a width of 57 mm and a length of 667 mm. Except for what described above (i.e., except that acetylene black in not in 0.6 weight parts but 1.2 weight parts was used as a conductive agent and polyvinylidene fluoride not in 2.7 weight parts but 1.7 weight parts was used as a binder), a cylindrical nonaqueous electrolyte secondary battery was formed in the same manner as in Working Example 1. The obtained battery was referred to as the battery 8.

<Evaluation of Resistance Between Current Collectors>

A resistance between a positive electrode current collector and a negative electrode current collector was measured for the batteries 1 through 4 formed in Working Examples 1 through 4 and the batteries 5 through 8 formed in Comparative Examples 1 through 4. A method used in this resistance measurement will be briefly described.

After each of the batteries 1 through 8 was charged using a constant current of 1.45 A until a voltage of each battery reached 4.25 V and was charged using a constant voltage until a current of each battery reached 50 mA, each of the batteries 1 through 8 was decomposed and the positive electrode and the negative electrode thereof were taken out. Then, after ethylene carbonate (EC) and an electrolyte attached to the positive electrode and the negative electrode were removed using dimethyl carbonate (DMC), the positive electrode and the negative electrode were vacuum-dried in normal temperature and part of the positive electrode mixture layer having dimensions of 2.5 cm×2.5 cm and part of the negative electrode mixture layer having dimensions of 2.5 cm×2.5 cm were brought in contact with each other. Thereafter, at a humidity of 20% or less and an ambient temperature of 20° C. and with application of a pressure of $9.8 \times 10^5$ N/m², a voltage when a current was flowing between the positive electrode current collector and the negative electrode current collector was measured by a four-terminal method and a direct current resistance was calculated. Evaluation results are shown in the following Table 1.

<Nail Sticking Test>

A nail sticking test based on the SBA standard was conducted for the batteries 1 through 4 formed in Working Examples 1 through 4 and the batteries 5 through 8 formed in Comparative Examples 1 through 4 to evaluate safety of the batteries. Conditions for the nail sticking test will be hereinafter described in detail.

Ten cells were prepared for each of the batteries 1 through 8 and each of the batteries 1 through 8 was charged using a constant current of 1.45 A until a voltage of each battery reached 4.25 V and then was charged using a constant voltage until a current of each battery reached 50 mA. For 5 cells out of the 10 cells of each of the batteries 1 through 8, a nail of φ2.7 was stuck in a center portion of circumference surface of each battery cell to pass through in the diameter direction in the environment where a nail sticking speed was 5 mm/sec and a temperature was 60° C. For the other 5 cells out of the 10 cells, a nail of ϕ2.7 was stuck in a center portion of circumference surface of each battery cell to pass through in the diameter direction in the environment where a nail sticking speed was 5 mm/sec and a temperature was 70° C. Test results are shown in Table 1 below.

TABLE 1

| | Resistance between current collectors | Case potential | 60° C. | 70° C. |
|---|---|---|---|---|
| Battery 1 | 1.6 Ω/cm² | None | 0/5 | 0/5 |
| Battery 2 | 4.0 Ω/cm² | None | 0/5 | 0/5 |
| Battery 3 | 1.6 Ω/cm² | None | 0/5 | 0/5 |
| Battery 4 | 1.6 Ω/cm² | None | 0/5 | 0/5 |
| Battery 5 | 1.6 Ω/cm² | Negative electrode | 0/5 | 2/5 |
| Battery 6 | 1.6 Ω/cm² | Positive electrode | 3/5 | 5/5 |
| Battery 7 | 1.2 Ω/cm² | None | 2/5 | 5/5 |
| Battery 8 | 0.2 Ω/cm² | None | 5/5 | 5/5 |

As shown in Table 1, none of the batteries 1 through 4 reached fume emission in the nail sticking tests in the environments at 60° C. and 70° C. In contrast, some of the batteries 5 through 8 reached fume emission in the nail sticking tests in the environment at 70° C.

The reason why a difference in the number of batteries which reached fume emission in the nail sticking tests in the environments at 60° C. and 70° C. between the battery 5 (60° C.: 0 cell, 70° C.: 2 cells) and the battery 6 (60° C.: 3 cell 70° C.: 5 cells) was observed is that the potential of the battery case differs between the batteries.

The reason why a difference in the number of batteries which reached fume emission in the nail sticking tests in the environment at 60° C. between the battery 7 (2 cells) and the battery 8 (5 cells) was observed is that the resistance between of the positive electrode current collector and the negative electrode current collector differs between the batteries.

In each of the batteries 1 through 4, the resistance between the positive electrode and the negative electrode was high (i.e., the resistance between the positive electrode and the negative electrode satisfied the condition of 1.6 Ω·cm² or more) and thus a short-circuit current flowing at a short-circuited point in the electrode plate group was suppressed and the battery case was insulated from each of the positive electrode and the negative electrode. Accordingly, a short-circuit current flowing through the battery case was suppressed. Therefore, no battery which reached fume emission was observed and it was confirmed that the batteries 1 through 4 were highly safe.

In each of the batteries 5 and 6, the resistance between the positive electrode current collector and the negative electrode current collector was high and thus a short-circuit current flowing at a short-circuited point in the electrode plate group was suppressed. However, since the battery case had a positive potential or a negative potential, a short-circuit current flowing through the battery case was large and thus batteries which reached fume emission were observed.

For the batteries 7 and 8, the battery case was insulated from each of the positive electrode and the negative electrode and thus a short-circuit current flowing through the battery case was suppressed. However, since the resistance between the positive electrode current collector and the negative electrode current collector was low, a short-circuit current flowing through the battery case was large and thus batteries which reached fume emission were observed.

Now, the batteries 1 through 4 formed in Working Examples 1 through 4 will be hereinafter described in detail.

In the battery 1 formed in Working Example 1, $LiNi_{0.80}Co_{0.10}Al_{0.10}O_2$, exhibiting flammability properties at low temperature, was used as the positive electrode active material. Then, 1) the resistance between the positive electrode current collector and the negative electrode current collector was set to be 1.6 Ω·cm² or more by reducing the amount of a conductive agent contained in the positive electrode mixture layer (specifically, for example, by using acetylene black in 0.6 weight parts (1.25 weight parts or less)). Also, 2) the battery case was insulated from the positive electrode and the negative electrode by adopting the structure of FIG. 1.

As described above, a short-circuit current flowing at a short-circuited point in the electrode plate group can be suppressed by taking the above described measure 1), and a short-circuit current flowing through the battery case can be suppressed by taking the above described measure 2). Thus, increase in temperature of the entire battery is not caused. Therefore, $LiNi_{0.80}Co_{0.10}Al_{0.10}O_2$, exhibiting flammability properties at low temperature, can be used as the positive electrode active material in a safe manner.

In the battery 2 formed in Working Example 2, as in Working Example 1, $LiNi_{0.80}Co_{0.10}Al_{0.10}O_2$, which was a low resistance positive electrode active material, was used as the positive electrode active material. Then, 1) the resistance between the positive electrode current collector and the negative electrode current collector was set to be 1.6 Ω·cm² or more (specifically, 4.0 Ω·cm²) by increasing the amount of the binder contained in the positive electrode mixture layer (specifically, for example, using polyvinylidene fluoride in 3.7 weight parts (2.7 weight parts or more), in addition to reducing the amount of the conductive agent contained in the positive electrode mixture layer as in Working Example 1 (specifically, for example, using acetylene black in 0.6 weight parts (1.25 weight parts or less)).

As described above, the resistance between the positive electrode current collector and the negative electrode current collector can be effectively increased by increasing the amount of the binder, in addition to reducing the amount of the conductive agent.

In the battery 3 formed in Working Example 3, 1) the resistance between the positive electrode current collector and the negative electrode collector was set to be 1.6 Ω·cm² or more by using, as the negative electrode active material, SiO (a high resistance negative electrode active material) exhibiting flammability properties at low temperature (specifically, for example, using SiO in 10 weight parts (70 weight parts or more). Also, 2) the battery case was insulated from each of the positive electrode and the negative electrode by adopting the structure of FIG. 1.

As described above, a short-circuit current flowing at a short-circuited point in the electrode plate group can be suppressed by taking the above described measure 1), and a short-circuit current flowing through the battery case can be suppressed by taking the above described measure 2). Thus, increase in temperature of the entire battery is not caused. Therefore, SiO, exhibiting flammability properties at low temperature, can be used as the negative electrode active material in a safe manner.

In the battery 4 formed in Working Example 4, 1) the resistance between the positive electrode and the negative electrode was set to be 1.6 Ω·cm² or more by using $LiFePO_4$ (high resistance positive electrode active material) as the positive electrode active material (specifically, by using $LiFePO_4$ in 100 weight parts (70 weight parts or more)). Also, the battery case was insulated from each of the positive electrode and the negative electrode by adopting the structure of FIG. 1.

As described above, a short-circuit current flowing at a short-circuited point in the electrode plate group can be suppressed by taking the above-described measure 2) and, in addition, a short-circuit current flowing through the battery case can be suppressed by taking the above-described measure 2). Thus, the battery does not reach fume emission. Specifically, a known battery employing LiFePO$_4$ (in other words, a battery in which only the above-described measure 1) is taken and which has the same structure as that of Working Example 2 for storing the electrode plate group into the battery case) has the possibility that the battery reaches fume emission due to a short-circuit current flowing through the battery case. However, in contrast to the known battery, the battery 4 (in other words, a battery in which the above-described measure 2) is taken in addition to the measure 1)) does not reach fume emission.

As has been described, to reliably prevent overheating of a battery (specifically, a battery in which a metal case containing, for example, aluminum is used for the purpose of weight reduction), it is necessary to take the following two measures:
1) The resistance between the positive electrode current collector and the negative electrode current collector is set to be 1.6 Ω·cm$^2$ or more; and
2) The battery case is insulated from each of the positive electrode and the negative electrode.

If only one of the two measures 1) and 2) is taken, the effect of preventing overheating of a battery can not be reliably achieved. Note that a lower limit of the resistance between the positive electrode current collector and the negative electrode current collector has been defined as "1.6 Ω·cm$^2$ or more". Needless to say, an upper limit of the resistance between the positive electrode current collector and the negative electrode current collector is defined to be in a range (of, for example, 40 to 100 Ω·cm$^2$) for a nonaqueous electrolyte secondary battery which can be normally used.

In addition, by taking both of the above-described measures 1) and 2), an active material (specifically, for example, LiNi$_{0.80}$Co$_{0.10}$Al$_{0.10}$O$_2$, SiO and the like) which conventionally can not be used in a known battery because it exhibits flammability properties at low temperature can be used in a safe manner.

Note that each of Working Examples 1 through 4 has been described using, as a specific example, the case where a metal case made of, for example, aluminum alloy is used as the battery case. However, the present invention is not limited to such case. For example, a metal case made of, for example, aluminum, iron, stainless steel, magnesium or the like may be used. Moreover, instead of a metal case, a laminate case may be used as the battery case.

In each of the Working Example 1 through 4, as a structure of a battery in which a battery case is insulated from a positive electrode and a negative electrode, the structure of FIG. 1 has been described as a specific example. However, the present invention is not limited thereto.

In Working Examples 1 and 2, the case where a compound expressed by a general formula LiNi$_x$Co$_y$Al$_{1-x-y}$O$_2$ (x=0.80, y=0.10) is used as a positive electrode active material exhibiting flammability properties at low temperature has been described as a specific example. However, the present invention is not limited to such case. Any compound may be used as long as an x value given in the general formula expressing the compound satisfies the relationship 0.7<x<1.0 and also a y value of the formula satisfies the relation ship 0.0<y<0.3.

In Working Example 3, the case where a compound expressed by a general formula SiO$_x$ (x=1) is used as a negative electrode active material exhibiting flammability properties at low temperature has been described as a specific example. However, the present invention is not limited to such case. Any compound may be used as long as an x value given in the general formula expressing the compound satisfies the relationship 0<x<2.

Industrial Applicability

As has been described, the present invention allows prevention of overheating of a battery, in which a metal case containing, for example, aluminum for the purpose of weight reduction is used, when the battery is internal short-circuited or the battery is damaged due to nail sticking or crush and thus can provide a highly safe nonaqueous electrolyte second battery. Therefore, the inventive nonaqueous electrolyte secondary battery is useful as a driving source for an electronic device such as laptop personal computer, a cellular phone, a digital still camera or the like and, furthermore, a power source for an electric power storage, an electric automobile or the like.

The invention claimed is:

1. A nonaqueous electrolyte secondary battery comprising:
a positive electrode which includes a positive electrode current collector and a positive electrode mixture layer provided on surfaces of the positive electrode current collector and containing a positive electrode active material, and to which one end of a positive electrode lead is attached, and;
a negative electrode which includes a negative electrode current collector and a negative electrode mixture layer provided on surfaces of the negative electrode current collector and containing a negative electrode active material, and to which one end of a negative electrode lead is attached;
a separator provided between the positive electrode and the negative electrode; and
a battery case in which an electrode plate group including the positive electrode and the negative electrode spirally wound or stacked with the separator interposed therebetween is stored with an electrolyte,
wherein a positive electrode sealing plate which is electrically insulated from the battery case and serves also as a positive electrode terminal is arranged on one opening edge portion of the battery case,
a negative electrode sealing plate which is electrically insulated from the battery case and serves also as a negative electrode terminal is arranged on the other opening edge portion of the battery case,
the other end of the positive electrode lead is connected to the positive electrode sealing plate,
the other end of the negative electrode lead is connected to the negative electrode sealing plate, and
after charging, when the separator is removed to bring a surface of the positive electrode mixture layer and a surface of the negative electrode mixture layer in contact with each other, terminals are respectively provided on the positive electrode current collector and the negative electrode current collector, and a resistance value between the terminals is measured, the resistance value is 1.6 Ω·cm$^2$ or more, and
the battery case is electrically insulated from the positive electrode and the negative electrode.

2. The nonaqueous electrolyte secondary battery of claim 1, wherein the battery case is a metal case.

3. The nonaqueous electrolyte secondary battery of claim 2, wherein the metal case contains aluminum.

4. The nonaqueous electrolyte secondary battery of claim 1, wherein the battery case is a laminate case.

5. The nonaqueous electrolyte secondary battery of claim 1, wherein the positive electrode active material is a compound represented by a general formula $LiNi_xCo_yAl_{1-x-y}O_2$,
   an x value given in the general formula satisfies a relationship $0.7<x<1.0$, and
   a y value given in the general formula satisfies a relationship $0.0<y<0.3$.

6. The nonaqueous electrolyte secondary battery of claim 1, wherein the negative electrode active material is a compound represented by a general formula $SiO_x$ and
   an x value given in the general formula satisfies a relationship $0<x<2$.

7. The nonaqueous electrolyte secondary battery of claim 1, wherein the positive electrode active material is a phosphate compound having an olivine structure and represented by a general formula $Li_xFe_{1-y}M_yPO_4$ ($0<x\leqq1$, $0\leqq y\leqq0.3$), and
   M given in the general formula is any one element of Nb, Mg, Ti, Zr, Ta, W, Mn, Ni and Co.

8. The nonaqueous electrolyte secondary battery of claim 1, wherein
   the positive electrode sealing plate is arranged on the one opening edge portion of the battery case with a gasket interposed therebetween,
   the negative electrode sealing plate is arranged on the one opening edge portion of the battery case with a gasket interposed therebetween,
   the positive electrode sealing plate is electrically insulated from the battery case by the gasket interposed between the one opening edge portion of the battery case and the positive electrode sealing plate, and
   the negative electrode sealing plate is electrically insulated from the battery case by the gasket interposed between the one opening edge portion of the battery case and the positive electrode sealing plate.

9. The nonaqueous electrolyte secondary battery of claim 1, wherein
   a positive electrode insulation plate is provided on one edge of the electrode plate group, and
   a negative electrode insulation plate is provided on one edge of the electrode plate group.

10. The nonaqueous electrolyte secondary battery of claim 9, wherein
    the positive electrode lead the one end of which is attached to the positive electrode extends through an opening of the positive electrode insulation plate, and the other end of the positive electrode lead is connected to the positive electrode sealing plate, and
    the negative electrode lead the one end of which is attached to the negative electrode extends through an opening of the negative electrode insulation plate, and the other end of the negative electrode lead is connected to the negative electrode sealing plate.

* * * * *